United States Patent
Alscher et al.

[19]

[11] Patent Number: 6,139,153
[45] Date of Patent: Oct. 31, 2000

[54] MOTION PICTURE CAMERA WITH A CAPPING SHUTTER

[75] Inventors: Edbert Alscher, Brunn a. Gebirge; Klemens Kehrer, Vienna, both of Austria

[73] Assignee: Arnold & Richter Cine Technik GmbH & Co. Betreibs KG, Munich, Germany

[21] Appl. No.: 08/811,392

[22] Filed: Mar. 4, 1997

[30] Foreign Application Priority Data

Mar. 4, 1996 [DE] Germany ............... 196 09 414

[51] Int. Cl.⁷ .............. G03B 9/08; G03B 9/10; G03B 9/28
[52] U.S. Cl. .............. 352/204; 207/208; 207/219
[58] Field of Search .............. 352/204, 207, 352/208, 210, 214, 218, 219, 220

[56] References Cited

U.S. PATENT DOCUMENTS

| | | | |
|---|---|---|---|
| 1,955,938 | 4/1934 | Berkowitz | 88/17 |
| 2,015,950 | 10/1935 | Mayer | 88/19.3 |
| 2,039,341 | 5/1936 | Parish | 88/19.3 |
| 3,300,271 | 1/1967 | Yamamoto | 352/214 |
| 3,597,067 | 8/1971 | Okuzawa | 352/169 |
| 3,885,864 | 5/1975 | Friesen | 352/204 |
| 4,284,332 | 8/1981 | Sekine | 352/208 |
| 4,592,632 | 6/1986 | Renold | 352/214 |
| 4,630,907 | 12/1986 | Mayer | 352/75 |
| 5,184,158 | 2/1993 | Grosser | 352/226 |

FOREIGN PATENT DOCUMENTS

| | | |
|---|---|---|
| 0454283 | 10/1991 | European Pat. Off. . |
| 1124809 | 3/1962 | Germany . |
| 1928857 | 12/1965 | Germany . |
| 4418471 | 5/1994 | Germany . |

Primary Examiner—Russell Adams
Assistant Examiner—Christopher E. Mahoney
Attorney, Agent, or Firm—Christie, Parker & Hale, LLP

[57] ABSTRACT

The invention relates to a motion picture camera having a camera lens, a gate disposed through a film path of a motion picture film, past which gate the motion picture film is moved intermittently by means of a film transport mechanism. A shutter is disposed between the camera lens and the gate. A capping shutter is disposed in front of the gate in the optical path between the shutter and the film which provides for a light-tight covering of the motion picture film during single-frame exposure or time exposures.

3 Claims, 4 Drawing Sheets

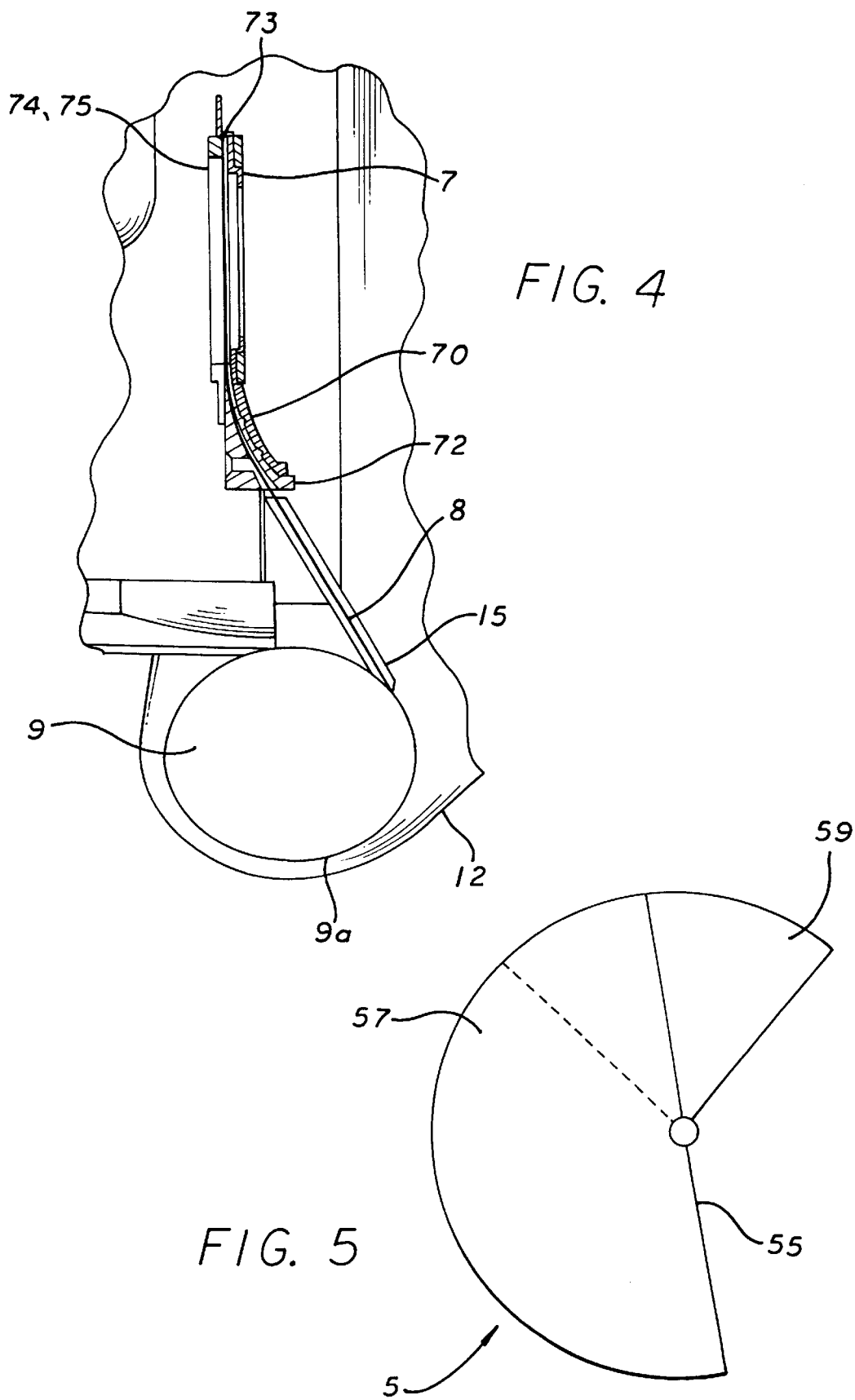

MOTION PICTURE CAMERA WITH A CAPPING SHUTTER

BACKGROUND OF INVENTION

This invention relates to a motion picture camera and specifically to a motion picture camera having a capping shutter which provides for a light-tight covering of the motion picture film during a single frame exposure or time exposures.

From DE 44 18 471 A1, a motion picture camera for exposure of a motion picture film is known, whereby the unexposed film fed from a film cassette intermittently passes a gate by means of a film transport mechanism, which is disposed in the focal plane of a camera lens. Between the camera lens and the gate, a rotating shutter disk, from which a shutter opening is cut out (i.e., the shutter disk is not a complete disk in that a section of it is missing) and which is alternatively connected via a gear with the film transport mechanism or is driven by a shutter motor, is provided.

During transport of the film from one frame to be exposed to the next, the optical path from the camera lens to the gate is covered by a shutter disk. When the next frame has reached a predetermined position in front of the gate, the optical path is cleared for exposure of the frame by the opening of the shutter disk. By means of a mirrored surface on the shutter disk, the optical path through the camera lens can be diverted during transport of the film, when the gate is covered by the shutter disk, to a viewfinder, a video assist, or the like. The rotating shutter disk which is inclined relative to the optical axis of the camera lens, must have a sufficient diameter such that it completely covers the gate. Moreover, the rotating shutter disk body when rotated must cover the optical axis for a sufficient time to allow for the transport phase of the film.

The rotating shutter disk design, in particular with time exposures, does not prevent roaming light from entering the area of the gate and reaching the film, resulting in faulty film exposures.

To preclude such faulty exposures, it is known in time exposures, such as single-frame exposures, to provide an additional covering shutter, referred to herein as a capping shutter, in front of the camera lens, which is closed between the single-frame exposures, therefore suppressing any beam entry into the camera lens and thus to the gate or the motion picture film. Such a capping shutter may consist, for example, of an iris shutter with multiple lamellae, which are moved by means of a lifting magnet. Not until immediately before the end of a dark phase or a pause in the exposure is this capping shutter opened by means of the lifting magnet clearing the optical path through the camera lens to the gate when the rotating shutter disk is appropriately positioned.

Such a capping shutter has, however, considerable weight, which is disposed in an disadvantageous position relative to the center of gravity of the motion picture camera because of the placement of the capping shutter in front of the camera lens. During operation, the relatively large and mechanically moving parts of the capping shutter cause vibration during exposure of the frame, such that there is a risk of unsharp blurry exposure.

In addition, there is for the cameraman no possibility of observing the image through the viewer or the video assist between the shooting of single frames since the capping shutter blocks the entire optical path through the camera lens and thus its diversion by means of the mirrored surface on the rotating shutter disk.

Moreover, such a capping shutter demands high outlays for construction and is thus expensive.

SUMMARY OF THE INVENTION

The object of the present invention is to provide a low weight light-tight covering for the motion picture film during single-frame exposure or time exposures, which has moving elements which can be disposed advantageously with regard to the center of gravity of the camera and which allows for a compact design of the motion picture camera. The covering must be simple to manipulate and must be capable of simple cost effective production.

The solution according to this invention guarantees a light-tight covering of the motion picture film during the dark phases, in particular during single-frame exposure and allow for the design of a lightweight capping shutter with small moving elements, such that during its operation no vibrations occur. The solution allows for placement of the capping shutter in the body of the camera such that there is no displacement of the center of gravity of the motion picture camera, allowing for a simple, compact design of the camera and guarantees simple operability even during single-frame exposures. Because of the small moving elements, control of the capping shutter by means of a small, simple drive motor is possible.

An advantageous embodiment of the solution according to the invention is characterized in that the capping shutter is disposed between the shutter and the gate, preferably immediately in front of the motion picture film.

This embodiment of the solution according to the invention enables viewing of an image through the viewfinder or via a video assist and the camera lens even in the closed position of the capping shutter such that the cameraman can perform all necessary adjustments even during the dark phases or pauses in exposure.

Another advantageous embodiment of the solution according to the invention is characterized in that the gate is provided with and/or connected to a shutter guidance device.

The disposition of a shutter guidance device with an insertion point for the capping shutter directly on the gate enables combining so-called image format masks to change the shooting format with the capping shutter while guaranteeing an absolutely light-tight seal when the capping shutter is closed.

An additional advantageous embodiment of the solution according to the invention is characterized in that the capping shutter is connected with a drive device, which is preferably disposed in a camera door which seals the inner chamber of the motion picture camera and can be controlled by the control electronics of the motion picture camera.

The disposition of the capping shutter with its drive in a modified camera door enables an easy exchange of the capping shutter, while the connection of the drive device with the control electronics of the motion picture camera incorporates the operation of the capping shutter into the electronics of the motion picture camera and thus, for example, allows for programmed control of the capping shutter which may alternatively also be implemented via a separate control device (laptop camera controller). The connection, of the camera door with the control electronics of the motion picture camera is preferably implemented via a cable.

Preferably, the capping shutter consists of a spring leaf which lies around a drum driven by the drive device and is guided in the shutter guidance device. This design of the capping shutter guarantees, on the one hand, minimal moved masses and, on the other, a high degree of flexibility as well as a small structural size through the winding of the spring leaf onto the drive drum such that the capping shutter causes no significant weight increase or enlargement of the external dimensions of the motion picture camera.

BRIEF DESCRIPTION OF THE DRAWINGS

The idea underlying the invention is explained in detail with reference to an exemplary embodiment depicted in the drawings.

FIG. 4 is an enlarged sectional depiction of the capping shutter mechanism.

FIG. 5 is a top view of the rotating disk shutter.

DETAILED DESCRIPTION

Figure 1:
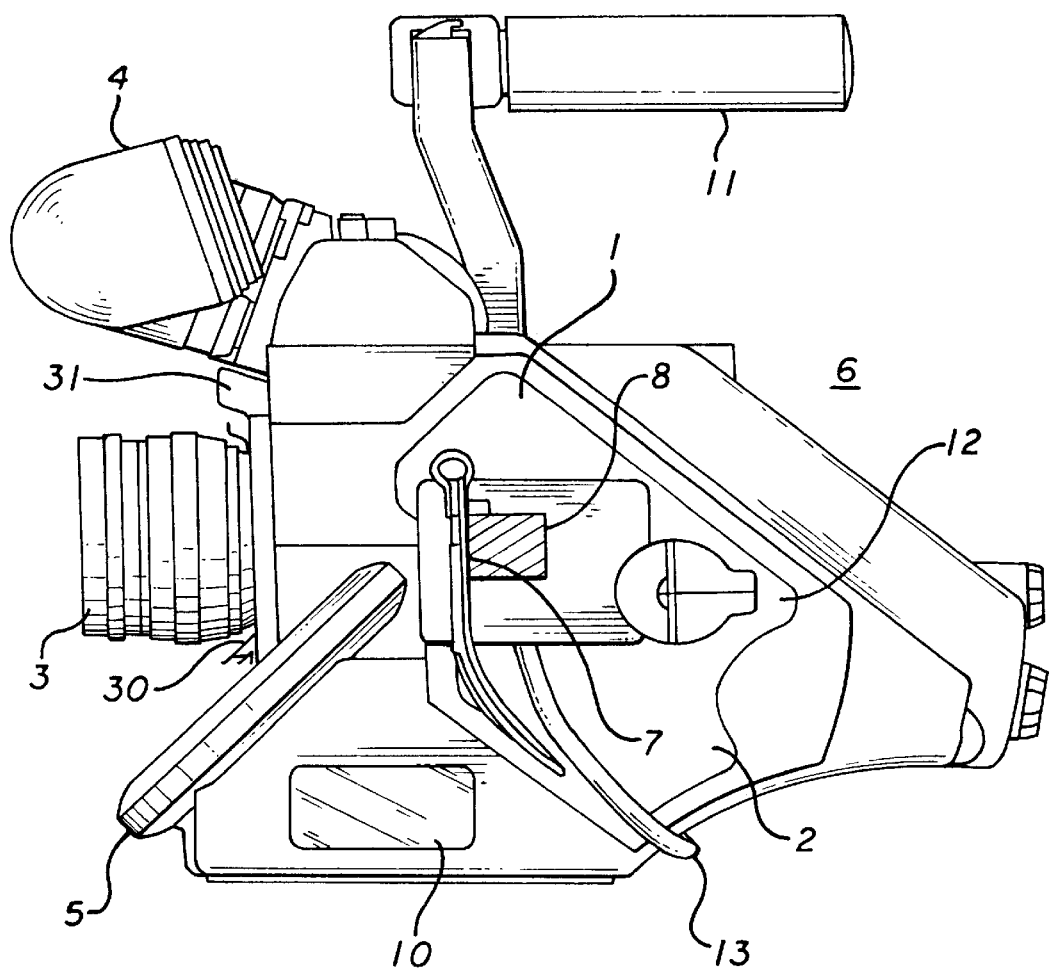
FIG. 1 is a side view of a motion picture camera with a rotating disk shutter, and a section view in the area of the gate.

The side view of a motion picture camera depicted in FIG. 1 shows the camera housing 1, the camera lens 3 attached to a lens mounting flange 30 and releasable by means of a unlocking button 31, the pivotable viewfinder 4. A film cassette (the location 6 of which is shown here) can be coupled onto the back of the camera housing 1. The unexposed motion picture film enters the motion picture camera through an opening in the camera housing 1 and leaves it through this opening as exposed film back to the film cassette 6.

The feed of the film consists of one or a plurality of film transport rollers (not shown) which move the film continuously, while a film transport mechanism 2 usually designed as a claw moves the film intermittently past a gate 7, which is disposed in the optical axis of the camera lens 3. During the transport phase of the film by the transport mechanism 2, the gate and film are covered by a rotating disk shutter 5 and cleared for exposure during the exposure phase. To do so, the rotating disk shutter has a cutout section 55 (FIG. 5). As such, the rotating disk shutter is not a complete disk. To compensate the continuous film movement and the intermittent film movement, loops of film (not shown) are formed on both sides of the gate 7.

The rotating disk shutter 5 is driven by a shutter motor, which is electrically coupled with the motor (not shown) of the film transport mechanism such that the speeds of the two motors are synchronized. Alternatively, a direct mechanical coupling may be provided, whereby the rotating disk shutter 5 is linked via a gear with the film transport mechanism 2.

The rotating disk shutter 5 is made up of a semicircular shutter disk, a shutter hub as well as a shutter axis and, in the case of a direct drive, a shutter motor. The surface of the shutter disk is mirrored such that the optical path from the camera lens 3 is diverted into the viewfinder 4, a video assist (not shown in detail) or the like. This beam diversion occurs while the gate 7 is covered by the shutter disk, such that during the time that the gate 7 is covered the motion picture film can be transported and the next frame is in front of the gate 7 by the end of the transport phase, when the shutter opening of the shutter disk clears the gate 7.

The rotating disk shutter 5 which is inclined relative to the optical axis of the camera lens 3 must have a sufficient diameter so as to be able to completely cover the gate when rotated. Moreover, the mirrored surface body 57 of the disk shutter must form an arc which when rotated covers the gate for a sufficient time to allow for the transport phase of the film. Typically, an arc of 180° is sufficient. With an additional adjustable sector shutter 59, it is possible to vary the covered time of the gate 7. The time period which the gate and thus, the film remains covered by the rotating disk shutter is also a function of the rotating speed of the shutter.

A control pad 10 is used to set different film transport speeds, exposure times, film transport profiles, etc. A handle 11 attached in the region of the center of gravity of the motion picture camera is used to carry the motion picture camera.

The gate 7 is also closable to the rotating disk shutter 5 by means of a capping shutter 8 movable perpendicular to the transport direction of the motion picture film and to the optical axis of the camera lens 3 such that exposure of the motion picture film is prevented independently of the position of the rotating disk shutter 5. When the capping shutter 8 is open, the exposure of the motion picture film depends as presented above on the position of the rotating disk shutter 5. If the capping shutter 8 is in front of the gate, i.e., in the "closed" position, viewing of the image through the viewfinder 4, the rotating disk shutter 5, and the camera lens 3 is possible while exposure of the film precluded, since the capping shutter 8 is located directly in front of the motion picture film.

The capping shutter 8 and its shutter drive 9 are preferably mounted to the camera door 12 and the capping shutter 8 is guided in guide channels on gate 7 such that it is movably positioned at a small distance from the motion picture film. Here, a configuration of the gate similar to the arrangement according to the European Patent 0 454 283 A2 can be provided.

Due to the disposition of the capping shutter 8 with its shutter drive on the camera door 12, an easy exchange of the shutter drive and of the capping shutter 8 is guaranteed and a coupling of the shutter drive with the control device of the motion picture camera or a separate camera controller via a cable connection 13 can be made.

Figure 2:
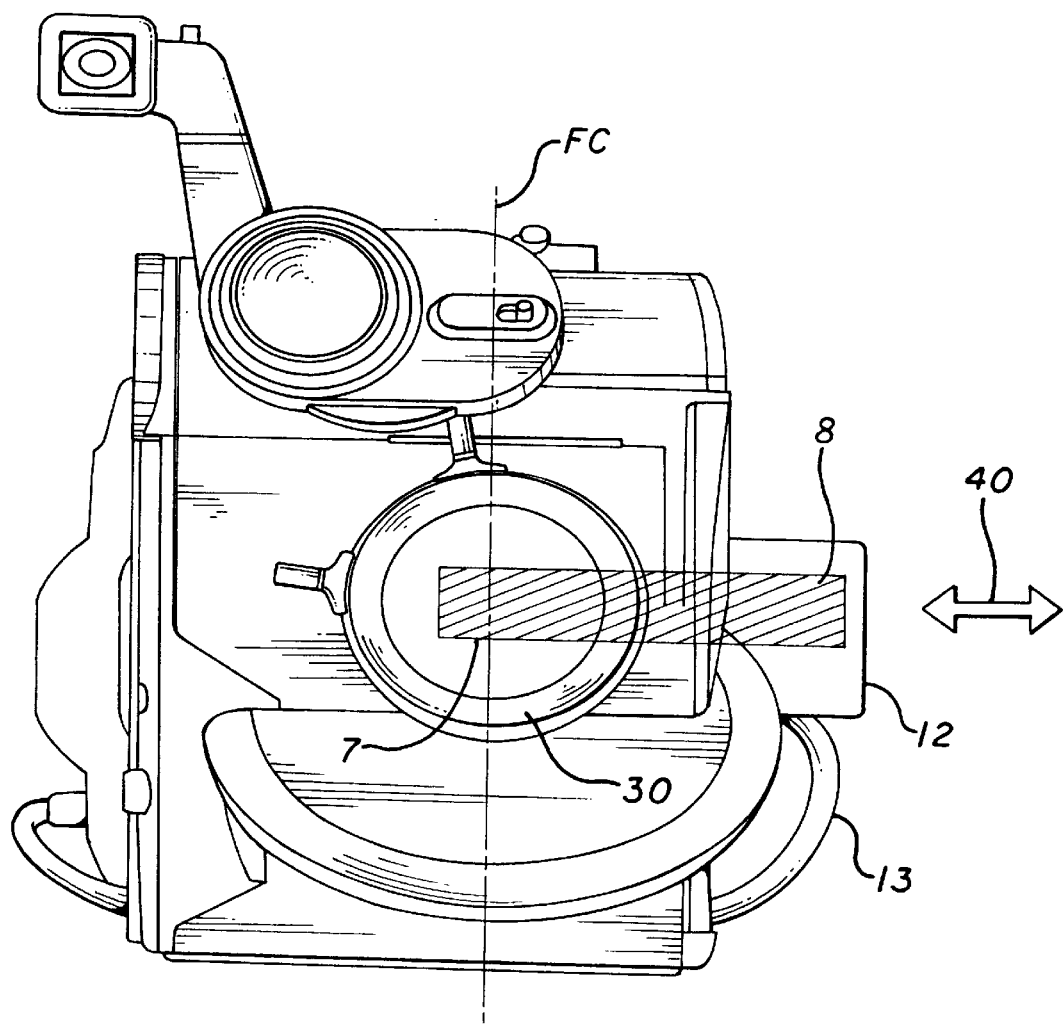
FIG. 2 is a front view of the motion picture camera according to FIG. 1 with a schematically depicted capping shutter.

The front view of the motion picture camera depicted in FIG. 2 presents the lens mounting flange 30 with the gate 7 disposed behind it. FIG. 2 illustrates the direction of movement 40 of the capping shutter 8, which runs both perpendicular to the film center FC and perpendicular to the optical axis, which runs perpendicular through the plane of the page. In the exemplary embodiment depicted here, the capping shutter 8 consists of a spring leaf which is pushed from the side of the camera in the direction of the double arrow 40 in FIG. 2 directly into the gate 7 of the motion picture camera and thus prevents the incidence of light on the frame during relatively long dark phases or exposure pauses, as for example, during single-frame operation.

The capping shutter 8 is disposed on the camera door 12 on which the shutter drive is also disposed. This is connected via the cable 13 with the control device of the motion picture camera or with a plug device for a separate camera controller.

Figure 3:
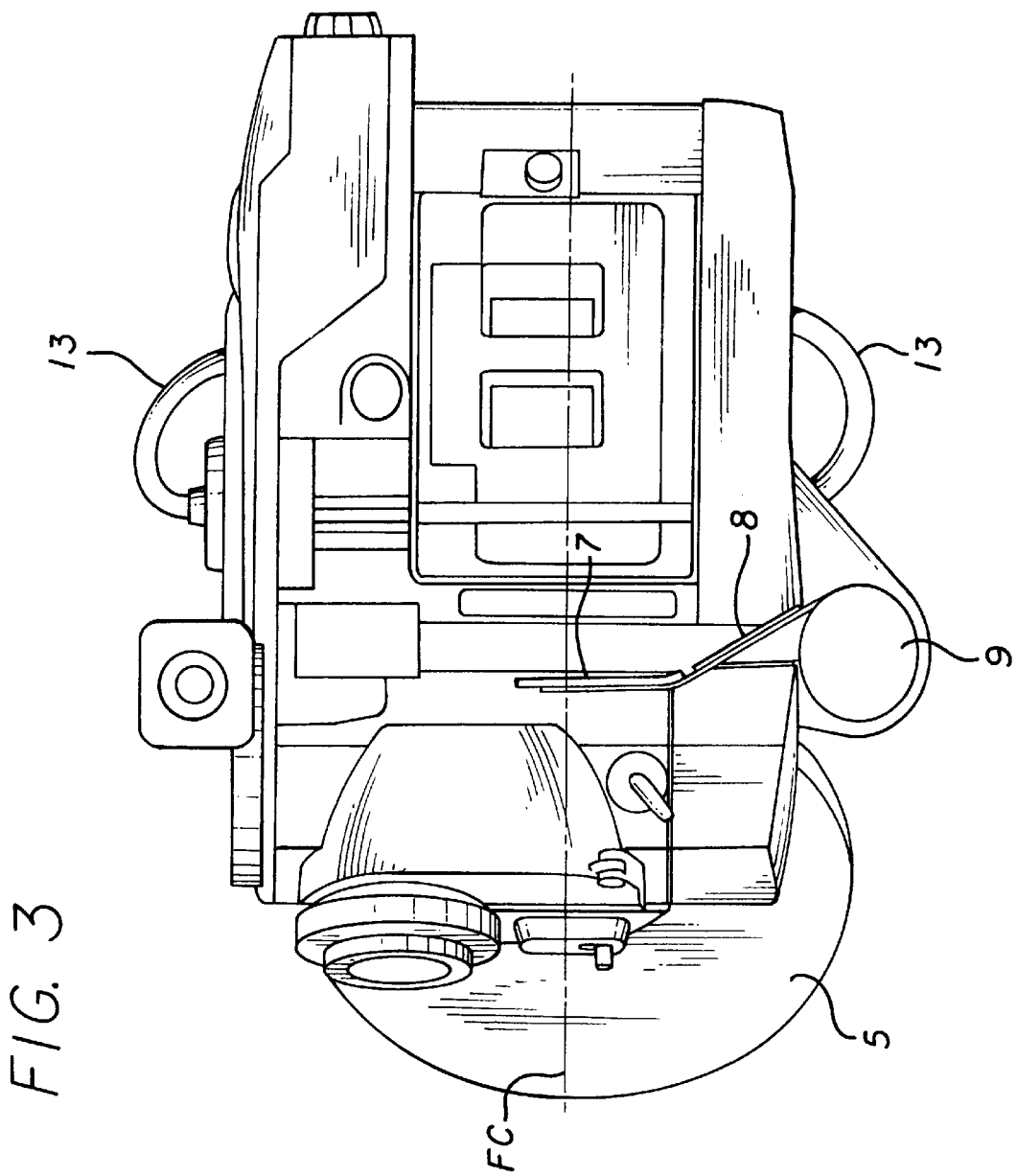
FIG. 3 is a top plan view of the motion picture camera according to FIGS. 1 and 2 with schematic depiction of the drive mechanism of the capping shutter.

FIG. 3, which depicts a top plan view of the motion picture camera, illustrates the disposition of the capping shutter 8 and the shutter drive 9 relative to the gate 7 and the camera housing 2, whereas FIG. 4 depicts the guidance of the capping shutter 8 and the shutter drive 9 in enlarged detail.

In a side wall 70 of the gate 7 facing the camera door 12, a funnel-shaped slot 72 is provided, through which the capping shutter 8 in implemented as a spring leaf can be introduced into the gate 7. Upper and lower guide channels 74, 75, as well as an additional slot 73 on the side wall of the gate 7 opposite the funnel-shaped slot 72 for end position guidance of the capping shutter 8, are used to guide the capping shutter 8. The guide channels 74, 75 and the slot 73 form a guide which for convenience is referred to herein as a "gate guide". A shutter guide 15, which typically completely surrounds the spring leaf, is used to guide the capping shutter 8 to the funnel-shaped slot 72 from the shutter drive 9. The shutter drive 9 has a drum-shaped take up 9a to roll up the shutter spring leaf 8 and is disposed in the exchangeable camera door 12. The shutter drive 9 drum-shaped take up rotates clockwise and counterclockwise. When it rotates in one direction which may be either clockwise or counterclockwise, the drum winds the spring leaf on the drum, while when it rotates in the opposite direction, it causes the spring leaf to unwind and extend through the shutter guide and the gate guide and over the gate.

The disclosure of attached German patent application 196 09 414.3, filed on Mar. 4, 1996 is incorporated fully herein by reference. Priority on this German application is claimed.

Although this invention has been described in certain specific embodiments, many additional modifications and variations will be apparent to those skilled in the art. It is therefore understood that within the scope of the appended claims, this invention may be practiced otherwise than specifically described.

What is claimed is:

1. A capping shutter system for use in a motion picture camera having a gate disposed through a film path in line to an optical path from a camera lens and control means for controlling the camera operation, the system comprising:

a spring leaf;

a shutter guide for guiding the spring leaf to the gate for blocking the optical path to the film; and a drum for moving the spring leaf along the guide, the spring leaf being wound around the drum wherein the drum rotates in a clockwise or counter-clockwise direction winding or unwinding the spring leaf around and from the drum, wherein when the leaf is wound around the drum it is retracted away from the gate and wherein when the leaf is unwound from the drum it is extended to the gate along the guide.

2. A capping shutter system as recited in claim 1 further comprising a gate guide in line with the shutter guide for guiding the spring leaf over the gate.

3. A capping shutter system as recited in claim 1 further comprising means for coupling the drum to the camera control means.

* * * * *